United States Patent

Ranta

[19]

[11] Patent Number: 5,838,672
[45] Date of Patent: Nov. 17, 1998

[54] METHOD FOR MEASURING THE TIMING OF A RECEIVED SIGNAL IN A COMMUNICATION SYSTEM AND MOBILE STATION IMPLEMENTING THE METHOD

[75] Inventor: Jukka Tapio Ranta, Salo, Finland

[73] Assignee: Nokia Mobile Phones Ltd., Finland

[21] Appl. No.: 723,016

[22] Filed: Sep. 30, 1996

[30] Foreign Application Priority Data

Oct. 3, 1995 [FI] Finland .................................... 954704

[51] Int. Cl.⁶ ............................ H03H 7/30; H03K 5/159; H04Q 7/00
[52] U.S. Cl. ........................ 370/335; 370/337; 375/210; 375/231; 455/517
[58] Field of Search .................................... 370/335, 337, 370/342, 347, 350, 503, 509, 514, 515; 375/202, 208, 210, 229, 230, 231, 341, 344; 455/425, 437, 456, 507, 517, 67.1, 67.6

[56] References Cited

U.S. PATENT DOCUMENTS

| 5,155,742 | 10/1992 | Ariyavisitakul et al. | 375/231 |
| 5,214,687 | 5/1993 | Kansakoski et al. | 455/425 |
| 5,222,101 | 6/1993 | Ariyavisitakul et al. | 375/231 |
| 5,276,691 | 1/1994 | Kivari | 371/47.1 |
| 5,303,226 | 4/1994 | Okanoue et al. | 370/442 |
| 5,479,444 | 12/1995 | Malkamaki et al. | 370/337 |
| 5,648,991 | 7/1997 | Namekata et al. | 375/231 |
| 5,710,796 | 1/1998 | Jarvela et al. | 375/371 |

FOREIGN PATENT DOCUMENTS

| 469 678 | 8/1993 | Sweden . |
| WO 90/06642 | 6/1990 | WIPO . |

*Primary Examiner*—Alpus H. Hsu
*Attorney, Agent, or Firm*—Perman & Green, LLP

[57] ABSTRACT

The invention relates to a method for measuring the timing of a received signal in a digital time division communication system and to a mobile station implementing the method. The mobile station receives bursts transmitted by a base station and measures the timing by means of a training sequence included in a burst. In the method according to the invention, the timing is measured by means of training sequences of at least two received bursts. In this way, the timing measurement result is more accurate than what is obtained by prior art methods. To improve the resolution of the measurement result, the sampled signal is advantageously interpolated in order to increase the number of samples. In addition, the measurement is performed in two steps so that first it is measured the timing of a burst with a long training sequence to obtain a timing estimate, and then it is performed a refined timing measurement by means of at least two bursts having a short or a long training sequence.

12 Claims, 2 Drawing Sheets

METHOD FOR MEASURING THE TIMING OF A RECEIVED SIGNAL IN A COMMUNICATION SYSTEM AND MOBILE STATION IMPLEMENTING THE METHOD

BACKGROUND OF THE INVENTION

1. Field of the Invention

The invention relates to a method for measuring the timing of a received signal by means of a training sequence coded in a burst and to a mobile station implementing the method. The method can be advantageously applied in a time-division communication network, such as the GSM (Global System for Mobile Communications) mobile telephone network.

2. Description of the Prior Art

The position information of a mobile station can be determined by means of a timing difference of signals received from several base stations. The timing difference measurement is performed using the received signal timing measurement which yields the signal timing information with respect to the mobile station's own clock. In addition to position location, the timng measurement has many other uses as well.

The timing information is generally measured in digital systems by means of a burst transmitted for that purpose. Below it will be described how a propagation delay is measured in the GSM system according to the prior art. The GSM system is further described in [1] The GSM System for Mobile Communications by M. Mouly and M-B. Pautet, 1992 and [2] British Telecom Technology Journal, vol 8, no 1, January 1990, "The GSM Radio Interface" by M. R. L. Hodges, pp. 31–43.

The GSM system is based on time division multiple access (TDMA) which uses several transmission frequencies. The TDMA frame structure in the GSM system is shown in FIG. 1. One TDMA frame consists of eight time slots each of which can transmit the burst of one transmission channel, in which the information transmitted is encoded.

In the GSM system, three types of bursts are transmitted from a base station to a mobile station; synchronization bursts, frequency correction bursts and normal bursts. The synchronization burst contains a 64-bit training sequence $TS_1$ and two 39-bit blocks $D_{1a}$ and $D_{1b}$ that are reserved for transmission of information. The burst starts and ends with 3-bit tails $T_{1a}$ and $T_{1b}$ and at the end there is an 8.25-bit guard period $G_1$. The synchronization burst is used for synchronizing the mobile station to the frame structure of the base station. In the frequency correction burst (not shown), all 148 bits are set to 0, and the purpose of the burst is to help the mobile station correct the local oscillator frequency error and find the synchronization burst. The normal burst contains a 26-bit training sequence $TS_2$ and two 58-bit blocks $D_{2a}$ and $D_{2b}$ that are reserved for the transmitted information. The normal burst has two tails $T_{2a}$ and $T_{2b}$ and a guard period $G_2$ which are similar to those of the synchronization burst. The normal burst is used for transmission on traffic and signalling channels. FIG. 2 shows the occurrences of frequency correction bursts f, synchronization bursts s and normal bursts n in a GSM control channel multiframe which comprises 51 TDMA frames (0 to 50).

The base station transmits at regular intervals to the mobile station a synchronization channel burst SCH which contains a long coded 64-bit training sequence which is also stored permanently in the mobile station. The mobile station extracts the training sequence from the SCH channel burst and performs a determination of correlation with the training sequence stored in the mobile station. The training sequence reception moment is then that moment where the correlation reaches the maximum. The accuracy of timing measurement depends on the length of the training sequence coded in the burst, and the resolution depends on the sampling rate.

PROBLEM TO BE SOLVED

A disadvantage of the method described above is that the measurement accuracy and resolution obtained are not adequate for all applications. Especially, the position location of a mobile station by means of the propagation delay or timing difference measurement requires in most applications better accuracy and resolution of the measurement result.

SUMMARY OF THE INVENTION

The object of the invention is to provide a method for measuring the received signal timing, thereby achieving measurement accuracy and resolution better than in the prior art.

One idea behind the invention is that the measurement is performed using at least two received bursts. The measurement accuracy can be substantially improved by using training sequencies extracted from several received bursts in the measurement. The measurement can also be performed using normal bursts which have a shorter training sequence. As normal bursts occur much more frequently than synchronization bursts, the measurement can be carried out quickly.

Timing measurement is advantageously performed in two stages, wherein timing is first measured for one synchronization burst to obtain a timing estimate and then a second measurement is performed using at least two bursts. Advantageously, also normal bursts can be used in addition to possible synchronization bursts in the second measurement. The resolution of the second measurement is advantageously improved by interpolating the number of samples of the training sequence extracted from the burst so that it becomes higher.

The method according to the invention is characterized by the characterizing part of claim 1. The mobile station according to the invention is characterized by the characterizing part of claim 10. Advantageous embodiments of the invention are described in the sub-claims.

BRIEF DESCRIPTION OF THE DRAWINGS

The invention is now described with reference to the accompanying drawings, where.

DETAILED DESCRIPTION OF THE PREFERRED EMBODIMENT

The invention is below disclosed by first describing an arrangement according to the invention in a general manner with reference to FIG. 3. Then, the application of the method in the GSM system is described in more detail and, finally, the mathematical aspect of the signal processing in producing the timing estimate is discussed referring to FIG. 4.

Figure 3:
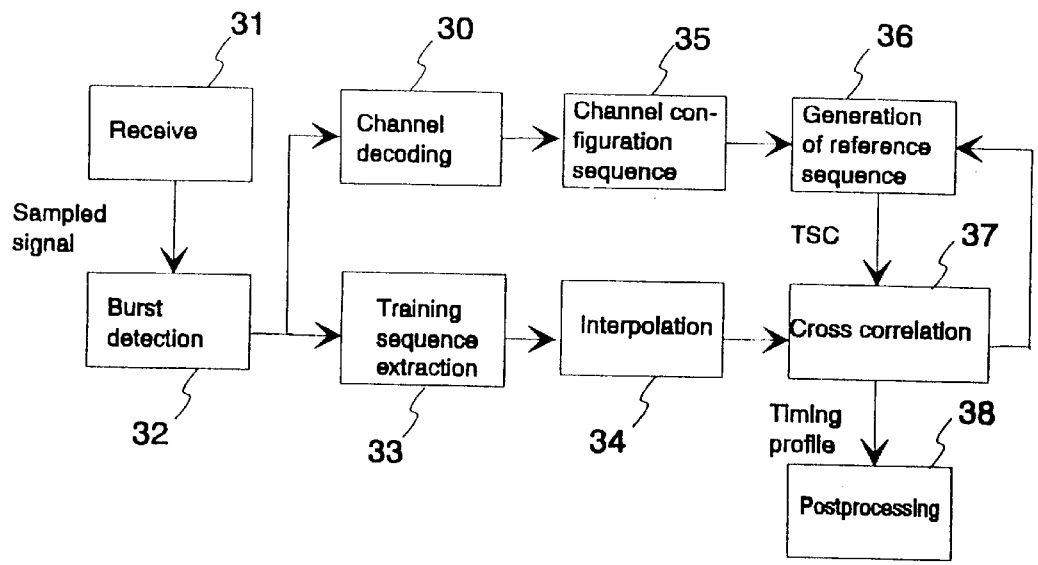
FIG. 3 shows an arrangement according to the invention in block diagram format and FIG. 4 shows the result of a determination of correlation in an arrangement according to the invention.

FIG. 3 shows an arrangement according to the invention to measure the timing of a received signal. In the arrangement, a received signal is sampled in block 31 and the burst to be measured is extracted from the signal, block 32. The training sequence part is extracted from the burst in block 33 and this signal part is interpolated, block 34. Control and traffic channel reception related to the normal operation of the phone is performed in block 30. In addition, information about the channel configuration used by the base station and particularly about the training sequence used is extracted from the base station parameters and commands received in conjunction with the normal operation of the phone in block 35. If the training sequence used by the system on the channel to be measured is known, that sequence is chosen as the sequence TSC used in the cross-correlation, block 36. The cross-correlation is performed between the interpolated training sequence extracted from the received signal and the selected training sequence TSC, block 37. The cross-correlation result is used to check in block 36 whether the selected training sequence TSC is the correct one. If the selection proves to be wrong, block 36 selects a new one from the training sequences used by the system until the right training sequence TSC is selected. When the correct training sequence has been found, the timing profile obtained as a cross-correlation result is processed in block 38 to determine the timing estimate. Block 38 collects obtained measurement results and uses them to determine the refined timing estimate by performing, for example, the mathematical operations described below.

Figure 1:
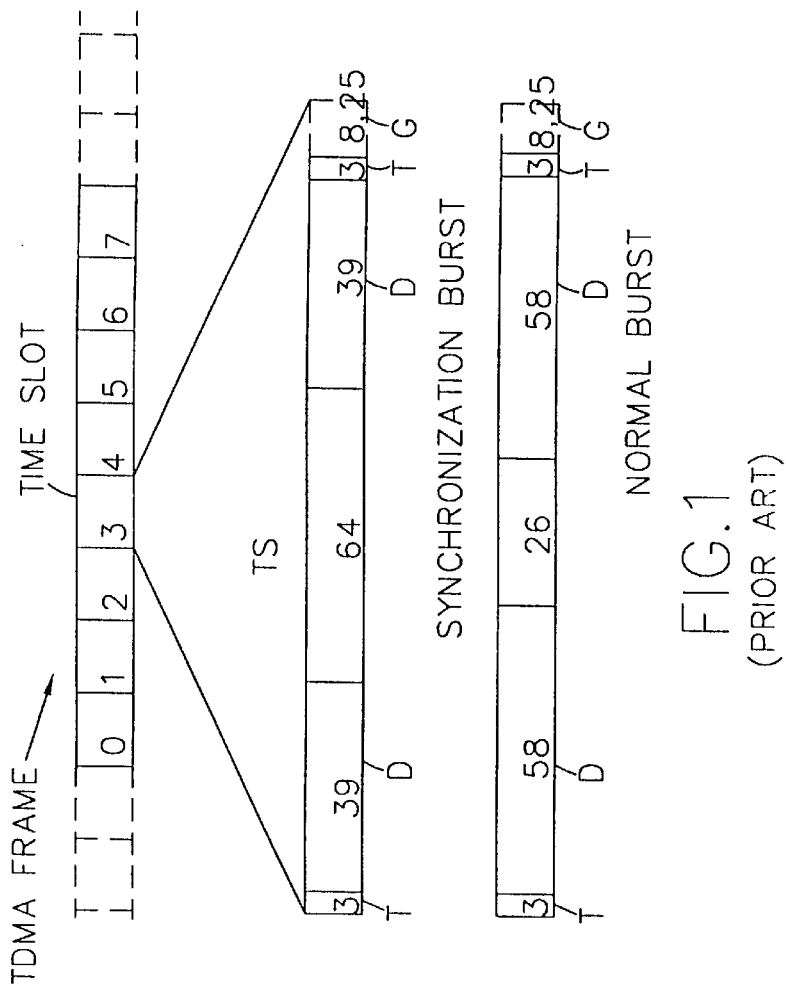
FIG. 1 shows the structure of a GSM TDMA frame according to the prior art and the synchronization burst and normal burst.
Figure 2:
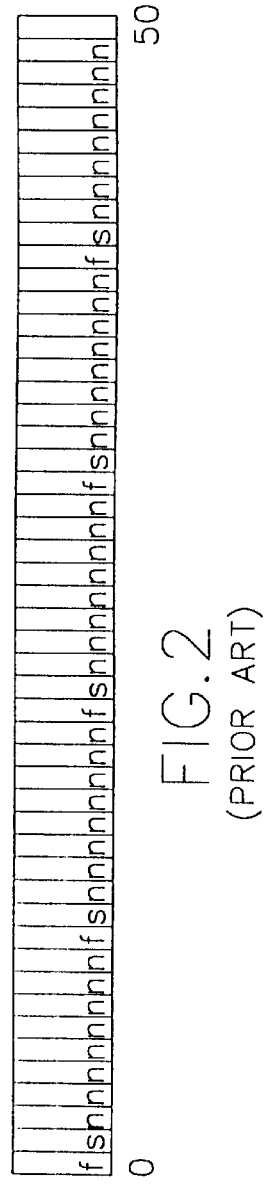
FIG. 2 shows a GSM TDMA multiframe according to the prior art.

FIG. 2 shows a 235-ms GSM base station to mobile station control channel multiframe comprising 51 TDMA frames. Each TDMA frame has 8 time slots each of which comprises one burst. So, each multiframe contains 408 bursts. The bursts can be divided into the following types:

5 frequency bursts f belong to the frequency correction channel FCCH. These bursts cannot be used for timing measurement as they do not have a training sequence.

A multiframe contains 5 SCH channel bursts s. These are specifically intended for timing measurement.

40 normal bursts n belong to the broadcast control channel BCCH or to the common control channel CCCH. Their training sequence is known to the mobile station because information about the training sequence of these channels is transmitted from the base station to the mobile station during connection set-up. So, they can be used for timing measurement, although the training sequence of a normal burst is shorter than that of a synchronization burst and the characteristics of the training sequence are not as good for timing measurement as those of the SCH channel burst.

The rest 357 normal bursts n belong to the common control channel CCCH, slow dedicated control channel SDCCH, slow associated control channel SACCH, fast associated control channel FACCH or to the traffic channels TCH. These, too, can be used for timing measurement, but their use is limited by the fact that the training sequence code is not always known to the mobile station.

All bursts mentioned above cannot be used in timing measurement, since burst reception simultaneously with transmission is usually impossible and also because it takes time to change the reception frequency of a mobile station, among other things. Indeed, one of the eight time slots of a TDMA frame is used for transmission and one for reception. Frequency change uses in total 4 time slots at the most, so normally there is at least two time slots available for timing measurement.

The GSM system specifies 8 possible training sequences for normal bursts, but usually a base station uses one permanent training sequence on all its channels. The training sequences used by the system are permanently programmed in the mobile station, and at the beginning of a call the base station sends to the mobile station the code of the training sequence used on the traffic channel. When the mobile station thus knows the training sequence of a logic channel, it can generally assume that the training sequences of other channels used by the same base station are the same and, therefore, use them for timing measurement.

In some cases the training sequences of SDCCH and TCH channels vary according to the connection. Then the training sequence coding can be found out using one of the methods described below.

If frequency hopping is not used, the training sequence of each time slot is constant as long as the connection using the time slot is active. Then the training sequence of a particular time slot can be found out by determining the correlation of the received training sequence with the alternative training sequences. The determination of correlation can be first performed with the known training sequence used on the broadcast control channel BCCH as it has the highest occurrence probability. In addition, the occurrence frequency of the various training sequences can be monitored, and determining of correlation can be performed according to the occurrence frequency so that the determining of correlation is first performed with the training sequences occurring most often.

If frequency hopping is used, the training sequence in a time slot of a TDMA frame may change as it can be used by several connections. In this case, too, the training sequence can be found out using the determining of correlation described above, but it has to be carried out continuously so as to detect a change of training sequences.

Timing measurement is usually performed for a received signal on a downlink transmission path. Timing measurement is advantageously started with an ordinary mobile station timing measurement that yields a result with a quarter-bit resolution which in the GSM system corresponds to about 0.9 microseconds.

Since the requirement for the timing measurement accuracy is much tighter than the received signal sampling interval, the number of signal samples is increased by means of interpolation before the refined measurement stage.

To obtain adequate accuracy and resolution, it is necessary to use a relatively high interpolation ratio. On the other hand, a great number of samples requires a lot of calculation in connection with the measurement. However, since a timing result of a certain accuracy was already obtained in the first measurement, that result can be used in the refined measurement so as to limit the correlation calculation window to correspond to the first result. Thereby it is possible to substantially reduce the need for calculation capacity.

Because of multipath propagation, the impulse response may have spread and it may contain several peaks. It is even possible that the received signal corresponding to the line-of-sight path is weaker than a reflected signal. Therefore, it is advantageous to monitor the shape of the impulse response and use the first received impulse response peak as the basis for the timing measurement.

The location estimate obtained on the basis of the timing measurement may contain errors caused by signal multipath propagation and noise. Noise can be reduced by applying linear low-pass filtering on the series of timing estimates or using running average calculation.

Next, we will determine the measurement accuracy obtained with the method according to the invention. Let the received signal, which is in the form of sampled data, be x(n)=i(n)+j*q(n), where n is the ordinal number of the sample. This signal is interpolated to increase the number of samples, whereby the interpolated signal is x'(k), where k=R*n and R is the interpolation ratio. This known signal interpolation method is described in more detail in [3] Discrete-Time Signal Processing, Alan V. Oppenheim and Ronald W. Shcafer, Prentice Hall, 1989, Chapter 3.6.2.

A known training sequence is modulated and interpolated to a higher sampling frequency. The result obtained corresponds to the ideal transmitted signal. Let this real-value signal be t(k).

The timing is then determined by calculating the impulse response estimate h(k) from the received interpolated signal x'(k):

$$h(k) = \sum_{i=0}^{N} x'(k+i)*t(k)$$

Figure 4:
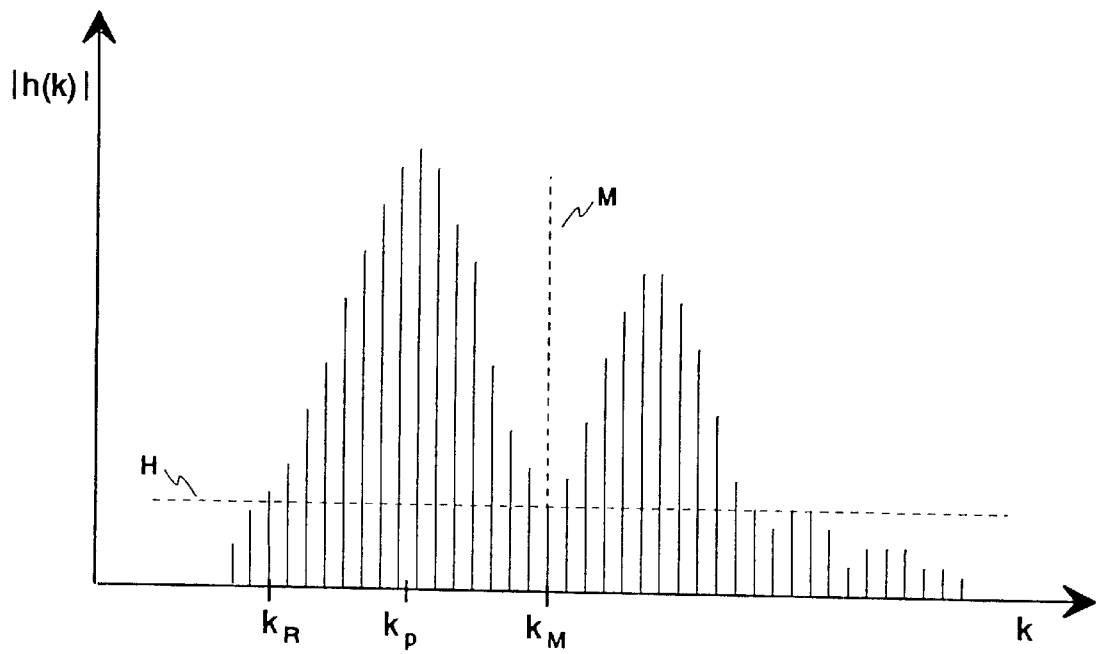

The amplitude |h(k)| of this impulse response is used in the timing measurement. An impulse response obtained in this way is shown in FIG. 4.

The first peak appearing in the impulse response amplitude usually represents the direct path of the signal while the other peaks represent reflected propagation paths. Since the direct propagation path is usually dominant in the impulse response, it is relatively easy to detect the first peak. In a noisy environment, however, the detection of the impulse response peak is more difficult. However, the detection inaccuracy can be compensated for by performing multiple measurements.

Below it is disclosed, with reference to FIG. 4, a simple algorithm to determine the first peak of the impulse response. First, it is found the first minimum M appearing after the first peak. This minimum amplitude is used as a threshold value H. Then the location of the first peak can be defined as the weighted average $k_p$ of the samples |h(k)| the amplitudes of which exceed the threshold value H and which come before the first minimum M:

$$k_P \approx \frac{\sum_{v=R}^{M} k_v * |h(k_v)|}{\sum_{w=R}^{M} |h(k_w)|}, \text{ where} |h(k_v)| > H \text{ and } |h(k_w)| > H$$

Let p(l) be a series of peak detection results obtained from successive measurements. Since the peak detection method occasionally yields a peak corresponding to an erroneously reflected signal, there may sometimes be severe errors in the detection result p(l). Therefore, the results can be advantageously filtered using a median filter:

p'(l)=median(p(l), p(l+1), . . . , p(l+L))

Since the error distribution is not symmetric, it is also possible to use a minimum filter to filter the results:

p"(l)=min(p'(l), p'(l+1), . . . , p'(l+L'))

Optimal values for constants L and L' can be determined by simulation and/or experimentally.

Finally, the peak location estimates p"(m) can advantageously be averaged to reduce the effect of gaussian noise and frequency errors.

As the peak location estimates p"(m), m=1 . . . N are averaged, the error is diminished as follows. Let the variance of the results p"(m) be $\sigma^2$. According to the central limit theorem, the average of estimates p"(m) follows the normal distribution $N(\mu,\sigma^2/N)$, whereby the variance of the average is inversely proportional to the number N of averaged samples and the standard deviation of the average is inversely proportional to the square root $\sqrt{N}$ of the number N.

Above it was described applications and ways of implementation of the method according to the invention. Naturally, the invention is not limited to the examples illustrated above but the principle according to the invention can be modified within the scope of the invention, as regards e.g. implementation details and fields of use.

Even though the application of the invention was described above in connection with the GSM system, the invention can be applied in other digital communication systems as well, such as the DCS 1800/1900 (Digital Communications System at 1800/1900 MHz), the TDMA system used in the USA (US-TDMA) or the digital system used in Japan (JDC), for example. Similarly, the method according to the invention is not limited to the channel, burst and training sequence structures described above. The invention can be advantageously used in conjunction with mobile station position location systems, but the invention can be used for timing measurement for other purposes as well.

I claim:

1. A method for measuring the timing of a received signal in a digital mobile communication system where bursts, each including a training sequence, are transmitted between a mobile station and a base station and a selected training sequence is stored in memory in the mobile station, wherein the steps comprise:

receiving a burst at the mobile station;

extracting a training sequence from the burst and performing a determination of correlation between the training sequence extracted from the burst and the selected training sequence stored in the memory to obtain a result, and measuring the timing of a received signal on the basis of the result obtained from said determination of correlation, characterized in that said timing is measured using the result obtained from the determination of correlation of training sequences extracted from at least two received bursts.

2. The method of claim 1, characterized in that the determination of correlation is performed for two training sequences extracted from received bursts to obtain a result, and the timing of the received signal is calculated on the basis of the results obtained from two or more determinations of correlation.

3. The method of claim 1, characterized in that the timing measurement step is performed for at least two training sequences extracted from received bursts to obtain two first timing results and the two first timing results obtained are used to produce a refined second timing result as a function of said two first timing results.

4. The method of claim 3, characterized in that said function is an average function.

5. The method of claim 1, characterized in that the number of samples of the training sequence extracted from a received burst is increased by interpolation in order to improve the resolution of the measurement result.

6. The method of claim 1, characterized in that in an initial step, timing is measured using a received first burst and in a subsequent step, more accurate timing is measured using at least two received bursts.

7. The method of claim 6, characterized in that said first burst is a synchronization burst.

8. The method of claim 6, characterized in that in said more accurate timing measurement performed in the subsequent step the determination of correlation is used, the correlation calculation window of which is determined on the basis of the timing measured in said initial step.

9. The method of claim 1, characterized in that the location of a mobile station is determined on the basis of the result obtained from the measurement of the timing of one or more received signals.

10. A mobile station including:
- means (31, 32) for receiving transmitted signals comprising bursts, with each burst having a coded training sequence therein, and for extracting a burst,
- means (33) for extracting a training sequence coded in the extracted burst,
- means (36) for storing a selected training sequence, and
- means (37) for determining a timing on the basis of said training sequence extracted from the burst and said stored training sequence, characterized in that said determining means (37) includes:
  - means for determining the correlation between said training sequence extracted from the burst and said stored training sequence, and
  - means for determining a timing result by means of the correlation between said stored training sequence and the training sequences extracted from at least two received bursts.

11. The mobile station of claim 10, further comprising means for storing at least the first two timing results, and means for calculating a second, more accurate timing result on the basis of said stored first two timing results.

12. The mobile station of claim 10, further comprising means for improving the resolution of the timing result including means (34) for increasing, by interpolation, the number of samples of the training sequence extracted from a received burst.

* * * * *